United States Patent

Scheer

[15] 3,648,141

[45] Mar. 7, 1972

[54] TAPE DRIVE ERROR-CANCELLING SYSTEM

[72] Inventor: David W. Scheer, Littleton, Colo.

[73] Assignee: Honeywell, Inc., Minneapolis, Minn.

[22] Filed: Mar. 11, 1971

[21] Appl. No.: 123,339

[52] U.S. Cl. ....................318/314
[51] Int. Cl. ....................H02p 5/16
[58] Field of Search ....................318/314, 318, 572

[56] References Cited

UNITED STATES PATENTS

| | | | |
|---|---|---|---|
| 3,218,532 | 11/1965 | Toscano | 318/572 |
| 3,257,595 | 6/1966 | Polakowski | 318/318 |
| 3,400,317 | 9/1968 | Thomas | 318/318 |
| 3,546,553 | 12/1970 | Loyd | 318/318 |
| 3,553,551 | 1/1971 | Arnold | 318/318 |

*Primary Examiner*—Bernard A. Gilheany
*Assistant Examiner*—Thomas Langer
*Attorney*—Arthur H. Swanson, Lockwood D. Burton and Mitchell J. Halista

[57] ABSTRACT

A tape drive system has a capstan speed control circuit using a comparator means for comparing a capstan speed responsive variable frequency signal with a reference frequency proportional to a desired capstan speed. A data storage memory is arranged to store a separate predetermined capstan speed correction signal for each of a plurality of capstan angular positions. The memory information is sequentially read concurrently with a sensing of each corresponding capstan angular position and applied in combination with an output signal from the comparator means to a capstan motor energizing means to control the capstan rotational speed.

4 Claims, 2 Drawing Figures

INVENTOR.
DAVID W. SCHEER
BY
M. J. Halista
ATTORNEY.

TAPE DRIVE ERROR-CANCELLING SYSTEM

BACKGROUND OF THE INVENTION

Conventional magnetic tape drive systems for driving a magnetic recording tape have used various means for controlling the speed of the tape in order to maintain the speed at a constant predetermined level, e.g., control a tape playback speed to be identical with a tape-recording speed. For example, the tape can be prerecorded with a clock, or sync, track at the time the data is being concurrently recorded in adjacent recording tracks. When the tape is used in a data-reproducing system to play back the data recorded thereon, the sync track is separately read by a control system arrangement commonly referred to as "sync-off tape" type of tape playback speed control. In such prior art systems synchronizing, or sync, the signal from the sync track is used in a feedback control loop to control the speed of the motor driving the tape during the playback operation and, hence, to maintain the playback speed of the tape at the same speed used during the recording process. Thus, the intrinsic tape drive system errors created by capstan eccentricity, bearing noise, etc. are minimized since the control signal comes from the tape itself and is affected by these errors. Since the mechanical errors are included in the aforesaid feedback control loop, the servosystem, if it has sufficient gain and bandwidth, is able to cancel all these intrinsic drive system errors.

On the other hand, another prior art arrangement, i.e., in a so-called "sync-off tach" tape system, a tone wheel is fastened to the shaft of the drive motor used to drive the tape capstan, and a sync signal is derived from a sensor operatively associated with the code wheel. In this case, tape drive errors due to capstan eccentricity, tape slippage, bearing noise and other mechanical effects are outside the feedback control loop and, hence, introduce errors in the tape speed which are reflected as errors in the playback data. Since the "sync-off tape"-type servocontrol system is often not practical inasmuch as it involves the loss of a data-recording track and requires a custom prerecording of a clock track, the "sync-off tach"-type control system is more commonly used and is, as mentioned above, subject to errors in the speed of the driven tape.

Accordingly, it is an object of the present invention to provide an improved tape drive system.

Another object of the present invention is to provide an improved tape drive system for cancelling intrinsic errors of the tape drive system.

A further object of the present invention is to provide an improved "sync-off tach"-type tape drive control system.

SUMMARY OF THE INVENTION

In accomplishing these and other objects, there has been provided in accordance with the present invention, a tape drive control system utilizing a data storage means for storing drive system correction signals for corresponding predetermined errors introduced in the operation of the drive system at respective operative positions thereof. These error-correcting signals are sequentially read from the storage means in synchronism with the operation of the drive system. The error-correcting signals are applied as secondary tape drive correction signals, in combination with a primary tape drive control signal derived from a sensor arranged to sense the motion of the tape drive system, to a tape drive energizing means to correct drive system errors.

BRIEF DESCRIPTION OF THE DRAWING

A better understanding of the present invention may be had when the following detailed description is read in connection with the accompanying drawings in which.

DETAILED DESCRIPTION

Figure 1:
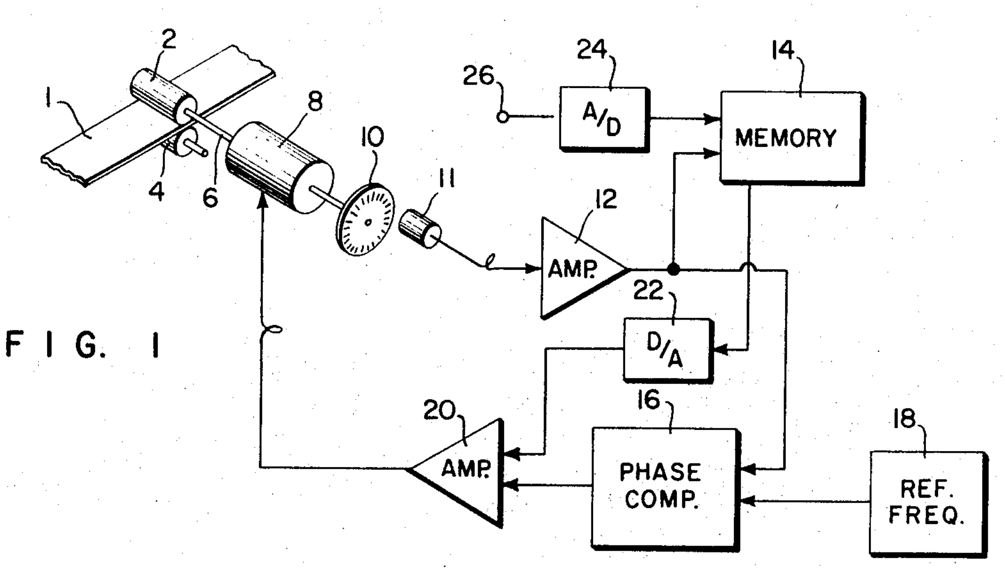
FIG. 1 is a pictorial block diagram of a tape drive system incorporating the present invention.

Referring to FIG. 1 in more detail, there is shown a pictorial diagram of an embodiment of the present invention in a tape drive system for driving a magnetic tape 1. The tape 1 is driven by the combined action of a rotatably driven capstan 2 and a pinch roller 4. The pinch roller 4 is actuated in a conventional manner to press the tape 1 against the capstan 2 by any suitable means (not shown), such means being well known in the art. The capstan 2 is axially aligned with and attached to an extension of a drive shaft 6 of a drive motor 8. The drive motor 8 is also arranged to drive a code wheel 10 having a pickup device, or sensor, 11 operatively associated therewith. The code wheel 10 and the sensor 11 may be any suitable prior art structure capable of producing a series of electrical signals having a frequency corresponding to the speed of rotation of the code wheel 10. For example, the code wheel 10 can be marked with indicia exhibiting an external magnetic field pattern, and the sensor 11 can be a magnetic pickup head arranged to sense the magnetic field pattern produced by the indicia and operative to produce electrical signals corresponding thereto.

The output signals from the pickup device 11 are applied to an amplifier 12. The output signals from the amplifier 12 are applied to a digital memory 14, to address storage locations therein, and as one input signal to a phase comparator 16. The phase comparator 16 may be any suitable device capable of comparing the frequencies of the two input signals applied thereto and producing an output signal representative of the phase difference between the compared signals, such devices being well known in the art. The phase comparator 16 is arranged to compare the output of the amplifier 12 with a second input signal derived from the output of a reference frequency generator 18 arranged to produce a reference frequency signal corresponding to a desired tape speed. The output signal from the phase comparator 16 is representative of a difference between the compared signals and is applied to a servoamplifier 20 to control a drive signal for the motor 8 produced by the servoamplifier 20.

Concurrently, output signals from a digital memory 14 representing digital signals derived from successively read storage locations in the memory 14 are applied to a digital to analog converter 22, hereinafter referred to as D to A converter 22, to be converted to corresponding analog signals. The output signals from the memory 14 are synchronized with the sensing of the indicia on the code wheel 10 by the application of the code wheel derived signals from the amplifier 12 to the memory 14 as memory address signals to produce a nondestructive readout of the stored signals. Thus, the signal obtained from a memory storage location corresponds to a rotary position of the code wheel 10. The output of the digital to analog converter 22 is applied to the servoamplifier 20 concurrently with the output signals from the phase comparator 16. The memory locations in the memory 14 can be initially filled by the output of an analog to digital converter 24, hereinafter identified as A to D converter 24, supplied by input signals from an input terminal 26 as more fully discussed hereinafter. On the other hand, the memory can be a read-only memory which is initially programmed, e.g., by preset wiring, when the tape system is built and is changed only if the drive system components are replaced to substitute new error corrections for the drive system errors introduced by the replacement components. Further, the A to D converter 24 and the D to A converter 22 may be part of the memory 14 with external electrical connections to the tape system shown in FIG. 1. Additionally, while the memory 14 is shown in FIG. 1 as being a digital memory it should be noted that an analog-type memory may be used with the only requirement being that the storage locations in the analog memory can be sequentially addressed by the output of the tone wheel sensor to provide a respective correction signal from the memory 14 for each position of the tone wheel indicia. In the case of an analog-type memory used for the memory 14, the A to D converter 24 and the D to A converter 22 would be eliminated from the system shown in FIG. 1.

In operation, the tape drive control system shown in FIG. 1 uses error correction signals sequentially read from the memory 14 in a secondary correction operation to correct for drive system errors which would, in the "sync-off tach", mode of operation, be normally uncorrected by the primary drive control means. This secondary correction operation is, accordingly, combined with the primary drive control to produce a tape drive system having electronically corrected drive system errors at various angles of rotation of the capstan 2 and drive motor 8. The number of error-correcting signals derived from the memory 14 may be any suitable number depending on the time response of the servo system, e.g., one-tenth the code wheel indicia rate. Thus, for a commercially available code wheel having 6,000 indicia thereon, the memory 14 would store 600 digital error-correcting words for sequential application to the servoamplifier 20 in phase with the rotation of the code wheel 10.

The digital words stored in the memory 14 may be initially derived from the operation of the tape drive system. For example, the memory 14 can be filled by recording a constant frequency signal from the reference frequency source 18 on the tape 1 in a "sync-off tach" mode of operation and, then, reproducing it in a "sync-off tape" mode of operation. The error, or difference between the reproduced signal and the signal from the constant frequency source represents the intrinsic mechanical errors of the tape drive system which need to be corrected.

Another technique for loading error-correcting signals into the memory is based on a measurement of a unwanted frequency sideband found in a reproduced record signal. A variable error-correcting signal is applied to the servoamplifier 20 and varied in phase and amplitude until the undesired sideband is attenuated to a desired level. The characteristics of the appropriate error-correcting signal are, then, temporarily entered into a storage means, e.g., the memory 14. The foregoing procedure would be repeated for all undesired sidebands, e.g., four, for each minimum group of indicia on the code wheel 10. By summing the separate error-correcting signals obtained by the aforesaid procedure for an indicia group, a composite error correcting signal is obtained which is stored in the memory 14 in a storage location corresponding to a memory address generated by the code wheel 10 as discussed hereinafter.

These error representing signals are sampled to obtain the desired number of correction signals to be used in the error-correcting system, e.g., one error-correcting signal for every 10 code wheel indicia. These sampled error representing signals are converted by the A to D converter 24 into digital signals that are sequentially stored in storage locations in the memory 14. Thus, the error-correcting signals stored in the memory 14 are correlated with the sequential rotary positions of the mechanical tape drive system. These correction signals can be used to correct mechanical errors of the drive system so long as the components of the mechanical drive system are not replaced. In the event of a replacement of a component of the mechanical system, e.g., the drive motor 8, the error-correcting signals in the memory would be amended by the aforesaid process to represent the new mechanical errors introduced by the replaced components.

The addressing of the memory 14 by the sequential signals from the sensor 11 is arranged to sequentially read the error-correcting signals stored in the memory 14. In other words, each storage location of the memory 14 is read concurrently with the occurrence of a respective code wheel position whereby a corresponding error-correcting signal is ultimately applied to the servoamplifier 20. The code wheel signals sensed by the sensor 11 are also applied in the primary feedback control loop to the phase comparator 16 to be compared with an output signal from the reference frequency generating means 18 which is arranged to generate a signal representative of a desired tape speed. The reference frequency means 18 can include means for selecting a particular reference frequency from various available reference frequencies corresponding, respectively, to different tape speeds. The output signal from the phase comparator 16 representing an error, or difference, between the signal sensed from the code wheel 10 and the output signal from the reference frequency means 18 is applied to the servoamplifier 20 to produce a primary, or basic error-correcting and energizing signal for the drive motor 8. The sequentially read signals from the memory 14 are concurrently applied through the D to A converter 22 to the servoamplifier 20 to provide secondary error-correcting signals for the intrinsic errors outside of the primary feedback loop in the "sync-off tach" mode of operation. By initially synchronizing the sequential reading of the memory 14 with the signals from the code wheel 10, e.g., a second sensor (not shown) reading a "home" position on the code wheel can address a first storage location in the memory 14, the secondary error correcting signals stored in the memory 14 are phased with the mechanical intrinsic errors of the tape drive system to provide corresponding correcting signals therefor. Thus, the primary and secondary error-correcting control signals are combined in the amplifier 20 to produce a composite control effect on the motor 8 to eliminate the effect of drive system errors.

Figure 2:
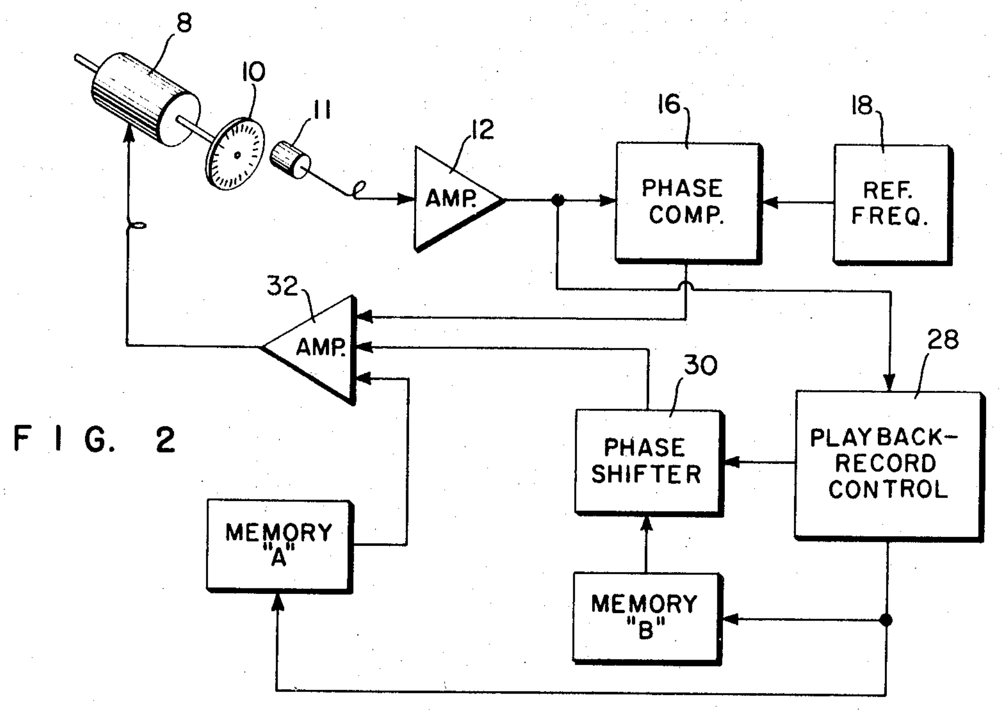
FIG. 2 is a pictorial diagram of a modification of the tape drive system shown in FIG. 1 and also incorporating the present invention.

In FIG. 2, there is shown a modification of the embodiment of the invention illustrated in FIG. 1 for use in tape drive systems wherein the record and playback heads are not located on the same side of the capstan 2. In such a system, the error-correcting signals required for capstan eccentricities are not the same for recording and playback operations. In the modified system of FIG. 1, the error-correcting signals used during the playback operation would be stored in memory "A" and the error-correcting signals for the record operation would be stored memory "B". A playback-record control means 28 is provided to select the error-correcting operation required between recording and playback and is operated concurrently with suitable means (not shown) for switching between the recording and playback operations. Specifically, the code wheel error-correcting signals would be stored in memory A and read out in accordance with the mode of operation previously described in FIG. 1. On the other hand, the error-correcting signals for capstan eccentricity errors would be changed in phase between recording and playback operations to reflect the difference in location between the record and playback heads. Thus, a phase shifting means 30 selectively operable by the playback-record control means 28 inserted in the circuit between memory "B" and a servoamplifier 32. The servoamplifier 32 of the system shown in FIG. 2 differs from the amplifier 20 shown in the system of FIG. 1 only in the number of input signals which are combined to produce a composite control, or energizing, signal for the motor 8.

The phase shifting means 30 is used during the playback mode of operation of the tape drive system to introduce a phase shift for the capstan error-correcting signals read out from memory "B." Thus, during the record mode, the memories "A" and "B" are read in synchronism with the timing signals derived from the sensor 11 sensing the rotation of the codewheel 10 and the error-correcting signals supplied to the servoamplifier 32. On the other hand, during the playback mode of operation, the code wheel error-correcting signals stored in the memory "A" are read out in the same manner as during the record mode of operation while the capstan error-correcting signals stored in the memory "B" are read out and shifted in phase by the introduction of a phase shift produced by the phase shifter 30. It should be noted that the phase shifter 30 could be eliminated by subdividing the second memory "B" into two separate memories with one of the memories having record capstan error-correcting signals stored therein and the other memory storing playback capstan error-correcting signals. These separate memories could then be selectively switched into the system by record-playback control means 28 as the tape drive was switched between playback and record operating modes whereby the timing signals from the sensor 11 would produce a sequential read out of the appropriate memory.

Thus, it may be seen, that there has been provided in accordance with the present invention, a tape drive control system operating in a "sync-off-tach" mode and having a primary drive control means and a secondary drive control means for correcting predetermined mechanical drive errors normally uncorrected by the primary drive control means.

The embodiments of the invention in which an exclusive property or privilege is claimed are defined as follows:

1. A drive system comprising:

means for producing a first signal representative of the speed of said drive system, reference signal means for producing a second signal, a comparator means for comparing said first signal and said second signal to produce an output signal indicative of the difference between said first and second signals, data storage means arranged to store a plurality of predetermined speed-correcting signals, first circuit means arranged to apply said first signal as an address to said data storage means to read out said correction signals, means for energizing said drive system in response to a control signal and means for applying said output signal from said comparing means concurrently with said correction signals read out from said memory means to said energizing means as a composite control signal to control the speed of said drive system.

2. A drive system as set forth in claim 1, wherein said first and second signals are variably frequency signals.

3. A drive system as set forth in claim 1 wherein said data storage means is a digital memory having selectively addressable data storage locations and a digital-to-analog converter for converting digital data read from storage locations of said memory to analog signals for application to said energizing means.

4. A drive system as set forth in claim 1 wherein said data storage means includes a first data memory for storing speed correction signals of a first type and a second data memory for storing speed-correction signals of a second type and wherein said first circuit means includes selectively operable means arranged to selectively route said first signal between said first data memory and said second data memory.

* * * * *